Patented Sept. 6, 1932                                                        1,876,229

UNITED STATES PATENT OFFICE

REGINALD OLIVER HERZOG AND LUDWIG BERENYI, OF BERLIN-DAHLEM, GERMANY

PROCESS OF MANUFACTURING HOLLOW MOLDED ARTICLES FROM SOLUTIONS OF FILM-FORMING CELLULOSIC MATERIALS

No Drawing. Application filed March 28, 1927, Serial No. 179,181, and in Germany November 5, 1926.

Our invention relates to a process of manufacturing molded articles, in particular hollow articles from solutions of cellulose, cellulose derivatives, and other organic colloids of the viscose type, i. e. material which is relatively non-plastic after having assumed a permanent set and which consequently requires to be manipulated in the condition of the solution.

In the manufacture of such hollow articles, in particular by the dipping method, the inconvenience is often found that the hollow article formed very firmly adheres to the walls of the mold, and can be detached from the mold only with difficulty and by special troublesome operations.

One principle of the invention lies in the fact that the parts of the mold, the core etc. which are used for molding the molded article entirely or partly consist of substances, which are more easily than the finished article brought in an unrigid, whether semi-liquid, liquid or gaseous condition, this being effected at temperatures, where the finished article is not damaged, so that the molded article and the mold may be easily separated from each other.

The new process is especially suited to the manufacture of hollow articles, the thickness of the walls of which is small in proportion to their other dimensions. Their manufacture, e. g. from solutions of cellulose, may be accomplished in such a way that by means of molds or cores, consisting wholly or partly, i. e. at their surfaces, of easily softening or easily melting substances like paraffine, the desired hollow body is produced in any known way, by casting, squirting, dipping, dusting etc., and then separation of the mold and the core on the one hand, and of the finished article on the other hand is partly or wholly effected by raising the temperature. The temperature must be raised until the mold partly or wholly looses its rigid form, or until the mold and the molded article no longer firmly adhere to each other.

The application of the process described above is especially advantageous for the manufacture of hollow articles of intersected, tapered, constricted or similar shapes, because in these cases the rigid, indivisible mold and the rigid indivisible hollow body spatially obstruct each other on dismounting. Such bodies are for instance spherical calottes greater than a hemisphere, pear-shaped, bottle-shaped, twisted or pearl-shaped articles.

In carrying out the invention we may work for instance as follows, it being understood that these examples are given by way of illustration only, and are in no way limitative.

Manufacture of a seam-less hollow sphere from celluloid: A full or hollow sphere consisting of paraffine, stearine, or the like is coated with celluloid by any known method, e. g. by dipping, lacquering, or the like, then the temperature is raised above the melting point of the mass forming the core, and the mass is allowed to flow out from the interior through one or two small holes left open. The holes of outflow may then be pasted in an imperceptible way.

A further example concerns the manufacture of seam-less hollow articles, for instance capsules, from cellulose regenerated from solutions. If a high degree of transparency is required, these products must dry under tension, this being the case, if they fit tightly to the core-mold. Hollow articles of cellulose so produced very firmly adhere to the drying mold, so that detachment is difficult, and can be scarcely effected by mechanical operations alone, when the hollow article is very dry. According to the present invention, separation can be obtaned by making, just as in the previous example, the mold, or parts of it, respectively, of easily softening or easily liquefiable substances like paraffine, stearine, waxes, or the like, or of mixtures of said substances with other substances. These materials, while having a lower melting point than that of the colloid to be molded thereon, will, at room temperature, be capable of resisting deformation under the compressive action of the colloid as it contracts upon the mold in assuming its permanent set and condition. In place of easily liquefiable substances easily volatile substances like naphthalene, α-nitro-naphthalene, camphor, tricyclodecane, acetophenone, acenaphthylene, thymol, diphenyl, chloral-acetone-chloroform, metaldehyde etc. may also be used. The mold may be either solid or hollow, or it may consist of not easily liquefiable substances, provided with an easily liquefiable coating. In the one case the mold is pressed or cast, and in the other case the mold, made of heat-resistant materials, is coated with a thin layer of the above mentioned substances or mixtures of substances, which, being solid or semi-solid at room temperature, are readily, in whole or in part softened, liquefied, or volatilized upon the application of heat. When a coated mold is desired, it may readily be prepared, by dipping the mold core either in a melt or in a solution of the substances which are to constitute the mold coating. The production and the drying of a hollow body of viscose or other solutions of cellulose on the core-mold prepared as described above is then carried out in any appropriate way known to the art. After reconversion into cellulose, and eventually, after other subsequent treatments, and after drying at a temperature not or but little exceeding room temperature, the temperature is raised until the substances of which the surface or the mass of the core is formed, are softened, liquefied or volatilized. By heating, or, if necessary, by admitting air, or by evacuating, the last remainders of the volatile substances of the core may be removed from the molded article separated from the core. The use of such volatile substances offers the advantage that these substances not only serve as sliding medium on dismounting, but also, by their vapour tension, especially when vacuum is applied, favour the separation of the molded articles from the cores, furthermore the last traces of such substances can be easily removed by simple operations, such as by steam, hot air, or by evacuation. It is also to be noted that the substances hereinabove named as being suitable for the production of the cores are all such as become either soft and semi-fluid, or melt into a liquid or begin to volatilize at the surface at a temperature which is lower than the temperature at which the materials of the molded articles are deleteriously affected. In other words, the softening temperatures, the melting temperatures or the boiling or evaporating temperatures of the core substances are below the temperatures at which the molded articles are damaged or detrimentally affected. For the sake of convenience, softening temperatures, melting temperatures, or boiling or evaporating temperatures will be hereinafter referred to under the comprehensive term "shape-modifying temperature" and the point at which such shape-modifying temperature begins to take effect will be termed the "conversion point."

When easily liquefiable substances are used, separation of the hollow article from the mold may be accomplished in such a way, that after separation by melting, a thin layer of the easily melting, again solidified, substances remain on the inner side of the hollow article, what in certan circumstances may be desirable. If however it is desired that the molded article be to a smaller or greater extent freed from the molten and resolidified layer of the mass of the mold, this may be done by a special operation e. g. by extraction with appropriate solvents.

Dismounting may be very easily effected both by hand and by mechanical means. In some cases, on suitable position, simply a sliding off of the molded article from the core may be obtained under the influence of gravity.

In other cases it may be found that the wall of the hollow article is crushed by the action of the vacuum, which is established between the mold and the molded article during dismounting. If, for instance, very thin layers (below about 1 mm) of liquefiable substances are used between the mold and the capsular molded article, the thickness of the wall of the latter being less than one hundredth of the diameter of the capsule, it is found, that the wall is bruised by the difference of pressure, the hollow article itself being flattened.

According to the invention, this difficulty is overcome by preventing the formation of a pressure difference by suitable operations. Two methods, among others, are recommendable, which will be described here by way of example.

The one method consists in providing the mold with hollows, splits or pores, thus making possible the access of atmospheric air between the mold and the molded article.

The other method comprises the use of diminished pressure at that side of the wall from which bruising of the hollow article by atmospheric pressure would ensue.

These methods, which make it possible to separate the mold and the molded article without any inconvenience, even when the walls of the latter are relatively thin, are not only applicable in the process claimed herein, which essentially comprises the use of substances which become unrigid by rise of temperature, but also in other known processes for the production of capsular hollow articles. By known processes are meant, for instance those which use greased or oiled molds and effect dismounting without raising the temperature. For instance, from viscose solutions, unobjectionable capsules, the thickness of the walls of which are 1/200 of the diameter of the capsule, may be produced on molds coated with vaseline, if dismounting is carried out without raising the temperature, but by applying vacuum.

In carrying out the process, it is important that the mass from which the mold or parts of it, respectively, is made, is so selected that it and the material of the molded article do not attack each other, for instance in consequence of some solvent action. Further, in the selection of the liquefiable or volatile material to be used for the mold, care should be taken, that at the temperature of its removal the hollow article is still rigid, and does not undergo undesired physical or chemical alterations, like production of fissures, recrystallization, decomposition etc.

The described process can be varied in different ways within the limits of the invention. In place of the liquefiable or volatile organic substances quoted in the examples given above, which form the mass or the surface layer of the core or of the mold, inorganic substances may also be used. Low melting salts and mixtures of salt hydrates, e. g. Glauber salt, as well as easily fusible metals and metal alloys etc. are to be taken into consideration. The particular layers or masses may be removed not only by heating, but, in a given case, by other means also, for instance by washing out with suitable solvents.

The hollow articles produced by the process described above from cellulose, cellulose derivatives, gelatine, or the like, are especially suited to receptacles for victuals, medicines, tobacco products, and small objects of daily use of all kind. For instance, cigarettes or cigars may be packed either in amounts commercially used or single into such transparent envelopes. These packings are hygienic, as they keep the goods contained in them free from germs of diseases, and offer the advantage of preventing a rapid evaporation of the aroma as well as a rapid loss or uptake of moisture.

With respect to these applications, it may be advantageous, that the hollow articles produced by the process described above be made to consist of several layers, or to have one layer chemically treated in some special manner. Thus coating of the wall of the hollow article with substances of other kind, or its chemical treatment either serves to improve its mechanical or optical properties or to increase its impermeability to air, water vapour, and aromatic substances, or for both purposes at the same time. For instance, the hollow articles made according to the process described above from cellulose or gelatin may, when finished, either before or after separation of the mold and the molded article, be coated with a solution of a cellulose ester, or with other lacquers, lacquer-like solutions, rubber solutions, turpentine, salts of the fatty acids or of oleic acid, or the like, or may be hardened by formaldehyde, or other chemicals acting in a similar way.

The production of the coatings for the purpose of making hollow articles consisting of several layers may also be performed after filling with goods, the packing thus being suitably closed.

We claim:

1. The process of manufacturing hollow articles consisting of a cellulosic colloid and having an orifice through which core material used in the process is withdrawn, which comprises preparing a core having an exterior configuration corresponding to the interior configuration of the desired product, said core being constituted at least at the exterior portions thereof of a substance capable at room temperature of resisting deformation by the compressive action of a colloid contracting itself on said core, said core substance further having a lower conversion point than that of the colloid to be molded thereon, bringing said core into contact with a cellulosic colloid solution whereby a relatively thin layer of colloid material attaches itself to the outer surface of the core, causing the solvent of said colloid layer to evaporate and the layer to contract within its own body upon and into compressive contact with the core material, whereby said layer assumes a permanent set and condition about the core exterior, then, via a non-aqueous medium, applying heat, shape-modifying with respect to the core but not with respect to the colloid material, said temperature being intermediate between the conversion point of the core material and the temperature which deleteriously affects the colloid material and by the application of such heat causing the surface of the core to pass into a non-rigid condition to a depth of the solid core material at least such as to loosen the core material from the molded article and to permit the withdrawal of the core material through the withdrawal orifice of the molded article and then in such condition of the core material withdrawing it unresistingly from the hollow molded article through its said orifice.

2. The process of producing hollow bodies from solution of cellulosic materials which comprises forming a rigid core shaped to the inner configuration of the hollow bodies to be produced and composed at least in its outer surface portions of material whose physical condition is rigid at room temperature but convertible to a non-rigid condition by heat alone and whose conversion point is intermediate between room temperature and a temperature at which the cellulosic material is injuriously affected, applying a film-forming solution of the cellulosic material to the core, causing the solvent to evaporate and the cellulosic material to contract on the core and then converting the core material from the rigid condition by the application of heat intermediate the stated limits until it assumes a condition where the core material is unresistingly removable from the interior of the hollow cellulosic body and finally in such condition of the core material withdrawing it unresistingly from the hollow molded article.

3. The process as set forth in claim 1 in which, after separating the hollow article from the core, a solvent of the core material, said solvent being a non-solvent of the cellulosic material, is introduced to the interior of the hollow article to cause the removal of residual core substance from the interior walls of the hollow article.

4. The process as set forth in claim 1 wherein the final application of heat to soften the core is effected via a molten bath constituted of the same material as that of which the core is made and the core material, as its surface melts, is taken up in said bath.

5. The process as set forth in claim 1 in which the hollow article, after having assumed its permanent set and condition, is coated exteriorly with a protective layer of material other than that of which the hollow article is constituted.

6. The process as set forth in claim 1 in which during the course of the separation of the core material from the molded article, a sufficiently low difference of pressure is maintained between the pressure inside of the molded article and the pressure exterior thereof to prevent crushing of its walls.

In witness whereof, we have hereunto set our hands, this 21st day of February, 1927.

REGINALD OLIVER HERZOG.
LUDWIG BERENYI.